UNITED STATES PATENT OFFICE.

ROBERT W. LESLEY, OF PHILADELPHIA, PENNSYLVANIA.

MANUFACTURE OF PORTLAND CEMENT.

SPECIFICATION forming part of Letters Patent No. 313,217, dated March 3, 1885.

Application filed June 14, 1884. (No specimens.)

*To all whom it may concern:*

Be it known that I, ROBERT W. LESLEY, of Philadelphia, State of Pennsylvania, have invented a certain new and useful Improvement in the Manufacture of Portland Cement, of which the following is a specification.

In artificial stone-work cements of various colors are greatly sought after, and tiles and blocks of various colors and designs are largely used. Black and gray and slate-color are among the colors preferred for these purposes, and in order to produce them, as well as other dark colors, various materials—such as lampblack, powdered charcoal, &c.—have been used, in most cases, however, with the effect of materially weakening the strength of the cement by the addition of an inert material, while at the same time materially adding to the cost of its production.

My invention relates to a new invention for the purpose of making black and other dark-colored cements by the combination, with the cement material after calcination and before or after or during the grinding operation, of a new material whereby the disadvantages above referred to are largely, if not entirely, overcome and a black or dark-colored cement of greater strength and of less cost than those manufactured under the processes now in use can be produced. The material I use is found in various parts of Pennsylvania, but principally in Lehigh county, where it is known as "black chalk." It is a black mineral having a greasy texture and hardening when exposed to the air. Chemically it contains varying proportions of silica, alumina, and lime, and a considerable proportion of iron. I have found that by taking this material in its raw condition and combining it in varying proportions, according to the degree of darkness desired, with the cement material of either Portland or "home-made" cements, after the calcining operation, and during, before, or after the grinding operation, black or dark-colored cements can be produced of the greatest strength and with the minimum of cost, as the material used is frequently to be found in proximity to cement deposits, and possesses itself, by its chemical composition, cement-making elements which combine advantageously with the cement material. Being, moreover, of a clayey character, it is easily and economically ground.

One way of carrying my invention into practical effect is as follows: I take cement-rocks or hydraulic limestones suitable for the manufacture of the ordinary home-made cement, and, after calcining them in the manner usually practiced for such purposes, I add to them twenty-five per cent., by weight, of the black chalk above described in a raw condition. The addition may be made either before or after or during the operation of grinding the calcined material to a powder.

Another way of carrying my invention into practice is as follows: I take Portland-cement material, calcine it to a clinker in the manner usually practiced in that industry, and then to the calcined product I add, either before, during, or after the grinding operation, thirty per cent. of black chalk in a raw condition. In some cases, where the cement material may be underlimed, I have found that the addition of the raw black chalk in so large a proportion may slightly weaken the strength of the cement, and in such case I find the difculty can be overcome by the addition of slaked lime, as covered by the invention of David Griffiths, this day filed.

I do not confine myself to the exact proportions hereinbefore stated, as the same may be varied, according to the darkness of color desired, without materially departing from my invention; nor do I desire to be understood as restricting myself to the methods of using it hereinbefore described, but I desire to include all of the methods mentioned, as well as any others; and

What I claim as new, and desire Letters Patent for, is—

1. The hereinbefore-described improvement in the manufacture of hydraulic cement, which consists in incorporating with calcined cement rocks or hydraulic limestones—such as are used in the manufacture of hydraulic cements—black chalk, substantially in the manner and proportions set forth.

2. The hereinbefore-described improvement in the manufacture of Portland cement, which consists in incorporating with the cement material after calcination black chalk, substantially in the proportions and in the manner set forth.

In testimony whereof I have hereunto set my hand this 12th day of June, A. D. 1884.

R. W. LESLEY.

Witnesses:
A. D. KACHLINE,
OLIVER J. FRANTZ.